United States Patent [19]

Snook

[11] Patent Number: 4,854,367

[45] Date of Patent: * Aug. 8, 1989

[54] NEW REFRACTORY COMPOSITIONS AND EVAPORATIVE PATTERN CASTING PROCESS USING SAME

[75] Inventor: Robert L. Snook, Houston, Tex.

[73] Assignee: Ashland Oil, Inc., Columbus, Ohio

[ * ] Notice: The portion of the term of this patent subsequent to Nov. 22, 2005 has been disclaimed.

[21] Appl. No.: 264,030

[22] Filed: Oct. 28, 1988

Related U.S. Application Data

[63] Continuation-in-part of Ser. No. 90,758, Aug. 28, 1987, Pat. No. 4,785,870, and Ser. No. 90,760, Aug. 28, 1987, abandoned.

[51] Int. Cl.$^4$ .................... B22C 7/02; B22C 9/04
[52] U.S. Cl. ......................................... 164/34; 164/45; 164/138; 164/246
[58] Field of Search ............... 164/34, 35, 36, 45, 164/138, 246

[56] References Cited

U.S. PATENT DOCUMENTS

| | | | |
|---|---|---|---|
| 4,448,235 | 5/1984 | Bishop | 164/34 |
| 4,482,000 | 11/1984 | Reuter | 164/34 |
| 4,651,798 | 3/1987 | Rikker | 164/35 |

Primary Examiner—Richard K. Seidel
Attorney, Agent, or Firm—Lockwood, Alex, FitzGibbon & Cummings

[57] ABSTRACT

An improved expendable pattern casting process and an improved refractory composition for coating expendable patterns used in the process comprising substantially spherical refractory material and an inorganic binder selected from the group consisting of aluminum phosphate, sodium silicate and potassium silicate.

16 Claims, No Drawings

REFRACTORY COMPOSITIONS AND EVAPORATIVE PATTERN CASTING PROCESS USING SAME

BACKGROUND OF THE INVENTION

This application is a continuation-in-part of my copending applications Ser. No. 90,758, filed Aug. 28, 1987 now U.S. Pat. No. 4,785,870, and Ser. No. 90,760, filed Aug. 28, 1987, now abandoned.

This invention relates to the production of castings by the evaporative pattern casting process. In particular, it relates to the coating of the pattern so as to provide adequate strength during the pouring of the molten metal and also provide adequate permeability for the venting of the gases formed by the vaporization of the expendable pattern by the molten metal.

The evaporative pattern casting process is a procedure that has become of importance in the production of castings for several reasons including the freedom of design that it permits. In addition, it requires only a limited outlay of capital and allows the foundry to pour the same pattern in different metals.

The technology for the preparation of the pattern is readily available since the usual material for its construction is polystyrene although other materials such as polymethylmethacrylate have been used for certain applications. A vital step in the process is the coating of the pattern since the coating not only controls the rate at which gases are produced and removed, but also must be strong enough to support the molten metal during the vaporization of the pattern. In the event that the coating does not provide adequate permeability for gases formed by the evaporation of the pattern during the pouring of the molten metal then the surface of the casting can be marred by what is known as the lustrous carbon defect. Normally only one coating of the refractory material is applied to the pattern to furnish the required thickness of refractory coating.

It is, therefore, an object of the present invention to improve the coatings used on patterns in the evaporative pattern coating process.

Another object of the present invention is the coating of the patterns used in the evaporative pattern coating process in a manner that the gases formed during the process can be properly vented thus avoiding the marring of its surface of the casting by the lustrous carbon defect.

Still another object of the present invention is the production of a coating for the patterns used in the evaporative pattern coating process which retain its shape during the time period when the expendable pattern is being vaporized.

Other objects will be apparent from the ensuing description.

SUMMARY OF THE INVENTION

It has now been found that the use of refractory material comprising a sufficient amount of a substantially spherical shape will give the required combination of gas permeability and strength to support the pattern during the pouring of the molten metal for the effective performance of the evaporative pattern casting process. This unique refractory composition produces castings that are of the desired shape and free of the lustrous carbon defect. The present invention contemplates a refractory composition comprising an inorganic binder selected from the group consisting of aluminum phosphate, sodium silicate and potassium silicate and a sufficient amount of substantially spherical refractory material to support the pattern during the pouring of the molten metal and evaporation of the pattern and to permit the venting of the gases formed by the evaporation of the pattern. Normally the refractory composition must contain, at least, about 10 percent by volume of substantially spherical refractory material. The refractory material component of the refractory composition of this invention can contain from about 10 percent by volume to about 100 percent of the substantially spherical shaped material. For most applications from about 10 to about 80 percent by volume of refractory material of substantially spherical shape will suffice.

It is particularly desirable that the substantially spherical refractory material be hollow. This material has the resulted strength and shape but does not add unnecessary weight to the refractory composition.

DETAILED DESCRIPTION

In essence, the improved evaporative pattern casting process of the present invention comprises forming a pattern of the desired article from vaporizable material such as polystyrene; coating the pattern with a refractory material comprising, an inorganic binder selected from the group consisting of aluminum phosphate, sodium silicate and potassium silicate and refractory material at least, about 10 percent by volume of a substantially spherical shape, placing the pattern in a container, vibrating unbonded sand around the pattern and pouring molten metal into the pattern to form the casting and evaporate the pattern. The permeability of the refractory composition of this invention permits the gas formed by the evaporation of the pattern to be vented while containing the molten metal during the evaporation of the pattern. Failure to properly vent the gases causes the lustrous carbon defect which mars the casting. Failure of the coating to contain the metal when it is being poured allows the molten metal to penetrate the coating and flow into the sand. The present compositions and methods prevent either of these defects.

In addition, other minor components, such as wetting agents, suspending agents, viscosity modifiers, preservatives, organic binders and other like materials known to the art for the preparation of such compositions can be present in a total amount that should not exceed five weight percent of the composition, preferably less than two percent by weight of the composition. These materials improve the quality of the composition by modifying the viscosity and surface tensiton of the water. Among materials that can be used are fluorinated surfactants such as the ZONYL brand products, alkylphenols such as nonylphenol, sodium lauryl sulfate, alkylarylsodium sulfonate, polyethylene glycol ether of primary and secondary alcohols, alkyl phenol ethoxylate, cellulose materials such as methocell, hydroxyethylcellulose, carboxymethylcellulose and the like.

In order to determine the significance of the use of substantially spherically shaped refractory material, a series of experiments were performed using refractory material containing varying amounts of the substantially spherical refractory material.

EXAMPLE 1

In these experiments, a product sold by Zeelan Industries under its trademark ZEOSPHERES was used as the substantially spherical refractory material. ZEOS- PHERES are thick walled, hollow spheres made of aluminum silicate. The non-spherical refractory material used in these experiments was aluminum silicate sold under the trademark KYANITE. This is a standard refractory material used as a coating for expendable patterns. Three formulations were prepared. In each formulation the only variable was the refractory material. The components such as the binders, suspending agents, etc. remained constant as to identity and amount, i.e., the refractory component constituted 36.4 percent by volume of the formulation and the remaining components constituted 63.6 percent by volume of the formulation. The non-spherical refractory commponent of the three formulations were as follows:

| Formulation A | KYANITE 200 mesh size | |
|---|---|---|
| Formulation B | KYANITE 100 mesh size | |
| Formulation C | KYANITE 100 mesh size | 70% by volume |
| | ZEEOSPHERES | 30% by volume |

Expendable polystyrene patterns coated with the same approximate thickness of each of the formulations obtained by multiple coatings of the three formulations were used to prepare a series of identical castings. These castings were inspected as to their shape and surface with the following results:

The castings prepared from the patterns coated with Formulation A had severe lustrous carbon defects on their surfaces.

The castings prepared from the patterns coated with Formulation B had lustrous carbon defects on their surfaces less severe than the lustrous carbon defects on the castings made from the patterns coated with Formulation A.

The castings prepared from the patterns coated with Formulation C did not have lustrous carbon defects on their surfaces.

EXAMPLE 2

A second set of experiments was performed using KYANITE 200 mesh size as the non-spherical refractory material and containing 15, 45 and 100 percent by volume of the substantially spherical hollow refractory material. Sufficient coatings were put onto each pattern to have a similar thickness of refractory material on each polystyrene pattern having the same volume percentage of substantially spherical refractory material. Two levels of binder material were used for each level of substantially spherical refractory material. Ten castings were poured from each formulation. The surfaces of the castings were rated by two persons (D, E) skilled in the casting field on a scale of 1-5, 1 representing a surface with no visible defects, 5 representing a rough surface and 2-4 representing intermediate levels of visible defects; 2 representing very slight visible defects, 3 representing a casting having slightly more defects and 4 representing a casting demonstrating lustrous carbon on the upper ⅓'s of its surface. The results were as follows:

| FORMULATION: | 1 | 2 | 3 | 4 | 5 | 6 |
|---|---|---|---|---|---|---|
| SPHERICAL BEADS (Volume % of Refractory Material) | 15 | 30 | 45 | 15 | 30 | 45 |
| BINDER CONTENT (Pounds/Drum) | 48 | 48 | 48 | 24 | 24 | 24 |
| COATING WEIGHT | 116.5 | 132.6 | 82.9 | 150.7 | 144.6 | 104.5 |
| (Grams) | | | | | | |

The results of the tests are as follows:

| | FORMULATION | | | | | | | | | | | |
|---|---|---|---|---|---|---|---|---|---|---|---|---|
| | 1 | | 2 | | 3 | | 4 | | 5 | | 6 | |
| TEST | D | E | D | E | D | E | D | E | D | E | D | E |
| 1 | 2 | 2 | 2 | 2 | 3 | 2 | 2 | 2 | — | — | — | — |
| 2 | 2 | 2 | — | — | — | — | 2 | 2 | 2 | 2 | 2 | 2 |
| 3 | — | — | 2 | 2 | 3 | 2 | — | — | 2 | 2 | 3 | 3 |
| 4 | 2 | 2 | 2 | 2 | 3 | 2 | — | — | 2 | 2 | — | — |
| 5 | 2 | 2 | 3 | 3 | — | — | 2 | 3 | — | — | 4 | 5 |
| 6 | — | — | — | — | 3 | 3 | 4 | 3 | 3 | 3 | 4 | 4 |
| 7 | 2 | 2 | 2 | 3 | 3 | 3 | — | — | — | — | 2 | 3 |
| 8 | 2 | 2 | — | — | 2 | 2 | 4 | 4 | 1 | 2 | — | — |
| 9 | — | — | 2 | 2 | — | — | 3 | 2 | 2 | 2 | 2 | 2 |
| 10 | 3 | 2 | 2 | 2 | — | — | 3 | 2 | 2 | 2 | — | — |
| 11 | 2 | 2 | — | — | 2 | 2 | — | — | 2 | 2 | 4 | 3 |
| 12 | — | — | 2 | 2 | 2 | 2 | 2 | 3 | — | — | 3 | 4 |
| 13 | 2 | 2 | 3 | 2 | — | — | — | — | 2 | 2 | 3 | 3 |
| 14 | 3 | 2 | — | — | 3 | 3 | 3 | 2 | — | — | 3 | 3 |
| 15 | — | — | 2 | 2 | 2 | 2 | 3 | 2 | 2 | 1 | — | — |

The castings made from the refractory material containing the substantially spherical hollow refractory material had surfaces improved in comparison to surfaces obtained by expendable patterns coated with refractory material not containing the spherical refractory material; however, the use of 100% spherical refractory material reduces the refractory characteristics of the coating and can cause the formation of a rough surface. Accordingly, it is preferred to use a maximum of about 80% by volume of the spherical refractory material and the remainder normal refractory material which, due to its shape, will provide an improved refractory coating when applied to the pattern. The optimum amount of the substantially spherical refractory material in the refractory composition will vary depending on factors such as the shape of the casting, identity of the other components of the formulation, the metal being poured and the like.

I claim:

1. An improvement in the process for the preparation of metallic castings by the evaporative pattern casting process wherein an expendable pattern is coated with refractory material prior to the pouring of molten metal to form a casting of the desired shape which comprises coating the expendable pattern with a refractory composition comprising a sufficient amount of substantially spherical refractory material and an inorganic binder selected from the group consisting of aluminium phosphate, sodium silicate and potassium silicate to support the pattern during the pouring of the metal and to vent the gases formed by the evaporation of the pattern so as to obtain a casting of the desired shape and surface.

2. The process of claim 1 wherein the inorganic binder is aluminum phosphate.

3. The process of claim 1 wherein the inorganic binder is sodium silicate.

4. The process of claim 1 wherein the inorganic binder is potassium silicate.

5. The process of claim 1 wherein the expendable pattern is made of expandable polystyrene.

6. The process of claim 1 wherein the refractory material comprises, at least, about 10 percent by volume substantially spherical refractory material.

7. The process of claim 1 wherein the substantially spherical refractory material is hollow.

8. The process of claim 1 wherein the refractory material is aluminum silicate.

9. The process of claim 1 wherein more than one coating of the refractory material is applied to the surface of the pattern prior to the pouring of the molten metal.

10. A process of the preparation of a casting by the evaporative pattern casting procedure which comprises forming a pattern of the desired article from vaporizable material, coating the pattern with a refractory composition comprising an inorganic binder selected from the group consisting of aluminium phosphate, sodium silicate and potassium silicate and refractory material at least, 10 percent by volume of a substantially spherical shape, placing the coated pattern in unbonded sand and pouring molten metal into the coated pattern causing the vaporization of the pattern and the formation of the desired casting.

11. The process of claim 10 wherein the expendable pattern is made of expandable polystyrene.

12. The process of claim 10 wherein the refractory material substantially consists of substantially spherically shaped material.

13. The process of claim 10 wherein the refractory material comprises, at least, about ten percent by volume substantially spherical refractory material.

14. The process of claim 10 wherein the substantially spherical refractory material is hollow.

15. The process of claim 10 wherein the refractory material is composed of aluminum silicate.

16. The process of claim 10 wherein more than one coating of the refractory material is applied to the surface of the pattern prior to the pouring of the molten metal.

* * * * *